United States Patent [19]
Bond et al.

[11] Patent Number: 5,658,127
[45] Date of Patent: Aug. 19, 1997

[54] SEAL ELEMENT COOLING IN HIGH SPEED MECHANICAL FACE SEALS

[75] Inventors: John C. Bond, Arvada; Harold R. Perriman; Stephen P. Murphy, both of West Minister, all of Colo.

[73] Assignee: Sundstrand Corporation, Rockford, Ill.

[21] Appl. No.: 592,824

[22] Filed: Jan. 26, 1996

[51] Int. Cl.⁶ .................................................. F01D 11/00
[52] U.S. Cl. .......................... 415/112; 415/111; 415/230; 277/15; 277/67; 277/71; 277/96.1
[58] Field of Search ................................ 415/105, 111, 415/112, 110, 169.1, 170.1, 230, 231, 229; 277/15, 18, 67, 71, 96.1

[56] References Cited

U.S. PATENT DOCUMENTS

| | | | |
|---|---|---|---|
| 3,194,342 | 7/1965 | Heim | 277/15 |
| 3,675,935 | 7/1972 | Ludwig et al. | 277/27 |
| 3,679,217 | 7/1972 | Lesiecki | 277/15 |
| 4,196,911 | 4/1980 | Matsushita | 277/96.1 |
| 4,961,678 | 10/1990 | Janocko | 415/170.1 |
| 4,990,054 | 2/1991 | Janocko | 415/111 |
| 4,997,340 | 3/1991 | Zinsmeyer et al. | 415/111 |
| 5,193,974 | 3/1993 | Hufford | 415/112 |
| 5,253,876 | 10/1993 | Gardner | 277/15 |
| 5,464,227 | 11/1995 | Olson | 277/96.1 |

FOREIGN PATENT DOCUMENTS

| 811299 | 4/1959 | United Kingdom | 122/5 |
|---|---|---|---|

Primary Examiner—Edward K. Look
Assistant Examiner—Mark Sgantzos
Attorney, Agent, or Firm—Sundstrand Corporation Intellectual Property Law Department

[57] ABSTRACT

A mechanical face seal is provided that incorporates fluid passages through either or both of a first and a second element of the seal for directing a flow of cooling fluid to an exposed area of the second element which extends radially outward beyond the contact area of the seal. The fluid passages are configured and oriented to provide more cooling flow through each seal element and over the surfaces of each seal element then is achievable with prior cooling and lubrication approaches, to thereby enhance heat dissipation from the elements of the seal to such a degree that lubrication, seal life and performance of the seal are improved. In preferred embodiments of the invention, the seal elements are specially configured to create an annular gap between the elements for centrifugally pumping fluid away from a contact area of the seal. One or more passages through either or both of the first and second elements provide a flow of fresh, relatively cool fluid into the annular gap at a position immediately adjacent but outside of the contact area. The flow of fresh fluid continuously replenishes the fluid pumped away from the contact area by the annular gap. A superior mechanism is thus provided for cooling a seal having a second element including a non-clamped silicon carbide mating ring insert carried by a mating ring carrier in compliance with American Petroleum Institute Standard 682.

13 Claims, 5 Drawing Sheets

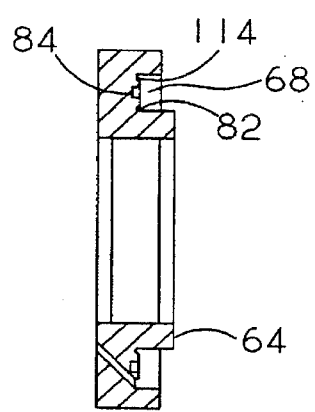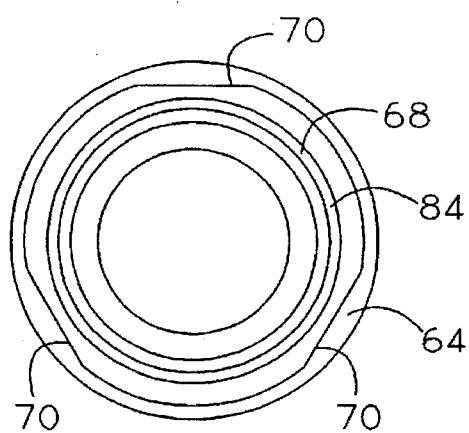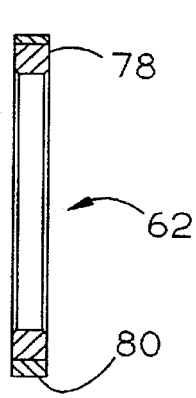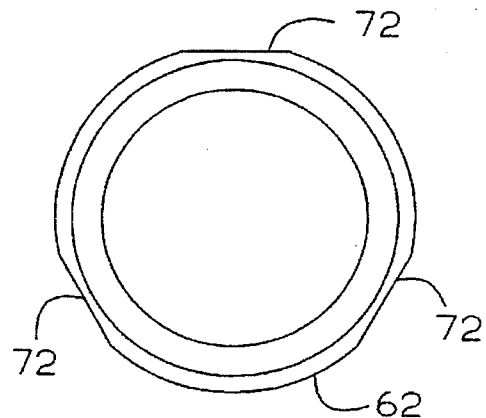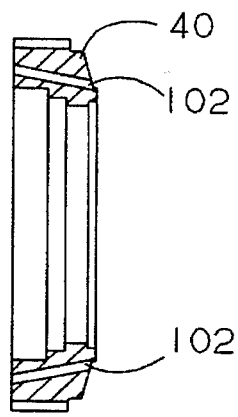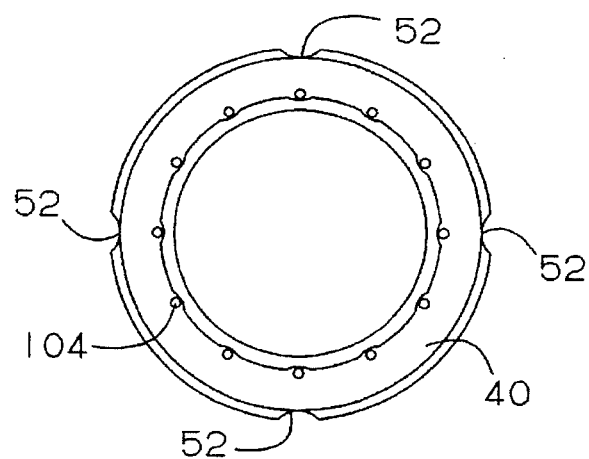

SEAL ELEMENT COOLING IN HIGH SPEED MECHANICAL FACE SEALS

FIELD OF THE INVENTION

This invention relates to a fluid device including a mechanical face seal which provides enhanced cooling and lubrication of the seal, through judicious placement of specially configured features and coolant fluid passages in the seal elements, and advantageous use of centrifugal pumping action created by such features and coolant fluid passages.

BACKGROUND

Mechanical face seals are commonly used in fluid devices, such as pumps or hydraulic motors, where a rotating shaft extends through a housing, for preventing leakage of fluid along the shaft in to or out of the housing. Such seals are principally comprised of two elements, having complementary radially extending planar surfaces which mate to form an area of contact that blocks leakage of the fluid.

For example, to seal an annular gap about a rotating shaft extending through a pump housing, a typical mechanical face seal includes a non-rotatable seal element attached to the housing, and a rotating mating ring element fixedly attached to the shaft. The rotating and non-rotating elements of the seal are held in contact with one another by a spring acting on one of the seal elements, to thereby block leakage through the annular gap of a fluid contained within the housing.

For such a face seal to effectively block leakage, therefore, the mating elements must be held in virtually intimate contact. This creates a problem in that when the shaft rotates, friction between the mating elements tends to cause wear and generates heat in the seal elements.

The seal elements are, therefore, generally constructed of specially selected compatible material pairs that in combination provide low friction and long life. For example, it is common to utilize a relatively soft material with inherently high lubricity, such as carbon graphite, for one mating element, in combination with a relatively hard material, such as silicon carbide, for the other mating element of the seal. Both elements of the pair are also typically ground to be optically flat throughout the area of contact to ensure a fluid tight seal and to reduce operating friction to a minimum.

A thin film of fluid between the mating surfaces in the contact area of the seal is generally provided to further reduce operating friction. In a pump, for example, the radially outer extent of the actual contact area between the rotating and stationary elements of the seal is typically exposed to the fluid within the pump housing. In contrast, the radially inner extent of the contact area is exposed to lower, sometimes ambient atmospheric, pressure around the shaft. If the fluid inside the housing is pressurized, a small amount of fluid will force its way into the contact area between the seal elements to form a lubricating film. Furthermore, even absent any significant pressure differential from inside to outside of the housing, relative motion between the mating elements as the shaft rotates, will tend to pump a small amount of fluid into and out of the contact area, to thereby providing the desired thin lubricating film of the fluid being sealed.

It must be understood, however, that although friction between the mating elements can be reduced by taking measures such as those described above, some friction must inherently remain in the contact area to keep the seal elements in intimate contact with one another for maintaining the fluid seal. Unfortunately, this inherently necessary friction generates heat in the mating elements, and in the lubricant film separating them, as the fluid device is operated. Such heat generation is a serious concern in the design of any mechanical face seal. This is particularly true for face seals which must operate at high rotational speeds such as, for example, several thousand rpm, and have relatively small surface areas available for transferring heat to a cooling fluid.

Unless some mechanism is provided for effectively removing the heat generated during operation, the temperature of the mating elements will rapidly increase to several hundred degrees above the average temperature of the fluid being sealed. Such an increase in temperature has two primary detrimental effects. First, excessive temperatures tend to physically destroy the seal elements themselves. Large temperature gradients will quickly develop in the seal elements between the contact area and portions of the elements which are located some distance away from the contact area. Large temperature gradients in materials such as silicon carbide can lead to fracture of the material. Warpage of the seal elements may also occur, thereby destroying the ability to prevent leakage. Second, high operating temperatures in the mating elements may cause vaporization of the lubricant film in the contact area between the mating surfaces, which leads to significant increases in friction and heat generation in the contact area. Such vaporization is particularly problematic in face seals which must operate with volatile fluids such as propane, liquid natural gas, propylene, or other fluids that tend to vaporize or combust at relatively low temperatures.

In summary, therefore, high operating temperatures accelerate wear in the seal elements, which in turn leads to the necessity for more frequent overhaul and repair, thereby significantly increasing operating costs. To achieve long operating life some effective mechanism must be provided for removing heat inherently generated during operation of the face seal.

Prior mechanical face seals have taken numerous approaches to solving lubrication and cooling problems such as those described above. Some rely solely on directing coolant into the actual area of contact between the seal elements via fluid passages extending through the stationary seal element. British patent 811,299 to Horsley is illustrative of this approach. This approach has proved to be ineffective in some instances, with respect to heat dissipation, for two reasons. First, the interior of the rotating element is not cooled. This results in uneven cooling of the rotating seal element, which creates unacceptably high internal stresses within the material of the rotating element. Such internal stresses can cause premature failure of the rotating element. Second, because the mating surfaces need to remain in virtually intimate contact in order to maintain the fluid seal, the maximum rate at which coolant can flow through the contact area is often too low to provide effective cooling. Pumping more fluid into the contact area for cooling purposes would require that the effective gap between the mating surfaces be made wider to accommodate the additional flow. As the flow into the gap is increased to meet demands for adequate cooling, the gap widens proportionately, and eventually opens an unacceptably large leakage path past the seal.

Other approaches have utilized fluid passages in the rotating elements in addition to passages through the stationary elements, but have provided inadequate cooling because they, like the previously described approach, direct the flow of coolant directly into the gap between the contact surfaces. U.S. Pat. Nos. 3,675,935 to Ludwig and 4,961,678 to Janocko employ this approach.

In one approach commonly applied to seals having elements which rotate at low speeds and have large areas or light loads, the seal is mounted in a wash plenum which is filled with a fluid used for cooling and lubricating the seal. As the seal elements rotate, heat is dissipated into the surrounding fluid through essentially static conduction and convection. Rotation and pressure differentials across the seal also cause a small amount of fluid to be drawn into the contact area for lubricating the seal.

At high rotational speeds, however, this approach does not work well, if at all. The rotating elements of such seals begin to act as centrifugal pumps, pumping or slinging fluid away from the contact area. Without a supply of coolant adjacent the contact area, friction and seal temperatures rise rapidly. An area of low pressure adjacent the contact area can also develop, causing volatile fluids to flash to a vapor state. Once the fluid around the contact area is replaced by vapor, seal friction, heat generation, and temperature rapidly increase, resulting in increased wear and reduced life of the seal.

The problems and inadequacies associated with prior approaches to cooling mechanical face seals are exacerbated in some fluid devices by a standard recently promulgated by the American Petroleum Institute (API). API Standard 682, entitled *Shaft Sealing Systems for Centrifugal and Rotary Pumps*, requires that in pumps subject to the standard which utilize a silicon carbide mating ring, the faces of the mating ring shall not be clamped, in order to facilitate repair and to preclude fracture of the mating ring due to clamping stresses. Generally, compliance with API 682 requires that the mating ring be carried as a loose fitting piece in a mating ring carrier element which is affixed to the rotating shaft, and forms part of the rotating element of the seal. Because the fit between the mating ring insert and carrier is loose, the ability to transfer or spread heat by thermal conduction from the insert into the carrier is significantly reduced.

Accordingly, further improvements are necessary to maximize coolant and lubrication fluid flow while maintaining a fluid seal. It is an object of our invention, therefore, to provide a mechanical face seal with improved life by enhancing heat dissipation and lubrication. Further objects of our invention include providing:

1) a mechanical face seal as above with improved fluid sealing capabilities;
2) a mechanical face seal as above having improved life, thereby decreasing overhaul frequency, and operating expense;
3) a mechanical face seal as above with improved performance at operating speeds as high as 35,000 RPM;
4) a mechanical face seal as above with improved performance in applications involving volatile liquids such as propane, liquid natural gas, and propylene; and
5) a mechanical face seal having improved cooling of a loosely fitting silicon carbide mating ring meeting the requirements of fluid devices subject to API Standard 682.

SUMMARY

Our invention provides such a mechanical face seal by incorporating fluid circulating features and passages into either or both of the first and second elements of the face seal for directing a flow of cooling fluid at or across exposed areas of the seal elements which are located radially outward beyond the contact area of the seal. These fluid circulating features and passages are configured and orientated to provide more cooling flow through each seal element and over the surfaces of each seal element than prior cooling and lubrication approaches, to thereby enhance heat dissipation from the elements of the seal. Our invention thus improves seal life and performance by increasing cooling fluid flow rates, dissipating a greater amount of heat, and enhancing lubrication. Our invention also provides superior cooling of a seal having a second element including a non-clamped silicon carbide mating ring insert carried by a mating ring carrier.

Specifically our invention provides a fluid device having a first and a second member wherein the second member extends through the first member, with the second member being mounted for rotation relative to the first member about an axis of rotation extending through the first and second members. The fluid device of our invention includes a mechanical face seal for preventing fluid leakage past the first member at the juncture of the second member and the first member. The mechanical face seal of our invention includes a first element and a second element that rotate relative to one another. The first element of the seal is attached fixedly to the first member of the fluid device, and includes a laying surface of the first element. The sectional element is attached to and rotates with the second member, and includes a laying surface of the second element. The faying surface of the first element includes a first portion in intimate contact with a portion of the faying surface of the second element, the portions of the first and second faying surfaces in intimate contact define an area of contact.

According to one aspect of our invention, the faying surface of the second element also includes a second portion extending radially outward past the area of contact. The first element defines at least one passage therein having an inlet and an outlet for directing a first flow of fluid for cooling and lubrication of the seal at the second portion of the faying surface of the second element.

According to a second aspect of our invention, the second element defines at least one passage therein having a radially inner inlet and a radially outer outlet for centrifugally urging a second flow of fluid through the second element. According to a preferred embodiment of this aspect of our invention, the second flow of fluid also impinges upon and/or flows across a portion of an outer surface of the second element of the seal to provide further enhanced cooling.

According to a third aspect of our invention, which is particularly suited for use in high speed seals, both of the first and second faying surfaces include a second portion thereof that extends radially outward beyond the contact area. The second portions are configured in a complementary manner to define an annular shaped gap, between the seal elements, which opens radially outward into a fluid plenum surrounding the seal. A fluid passage passing through one of the seal elements delivers a flow of fluid into the annular gap at a point just radially outward from the contact area. As the seal rotates, the annular gap functions as a centrifugal pump that in combination with the fluid passage provides a continuous flow of fresh, relatively cool fluid against and along surfaces of the seal elements located immediately adjacent the contact area of the seal. By carefully configuring the annular gap, and by strategically locating the fluid passage of our invention, we have turned an inherent problem in former high-speed seals into a means for providing significantly enhanced heat transfer in seals incorporating our invention.

The fluid passages in either or both of the first and second elements of our seal, in combination with the centrifugal pumping action created by the annular gap and the radially outward directed passage in the second element, yield higher cooling flow rates, enhanced lubricity, more effective heat dissipation, and longer seal life than prior rotating face seals. Our invention is applicable to a wide variety of fluid devices having a second member rotatable about an axis and extending through a first member, and utilizing a mechanical face seal for preventing fluid leakage past the first member at the juncture of the second member and the first member of the fluid device. It should additionally be recognized that in some embodiments of our invention, the first element may also rotate, so long as there is relative motion between the first and second elements.

BRIEF DESCRIPTION OF THE DRAWINGS

FIG. 4–9 depict several individual elements of the face seal of FIGS. 1–3a.

DETAILED DESCRIPTION

Figure 1:
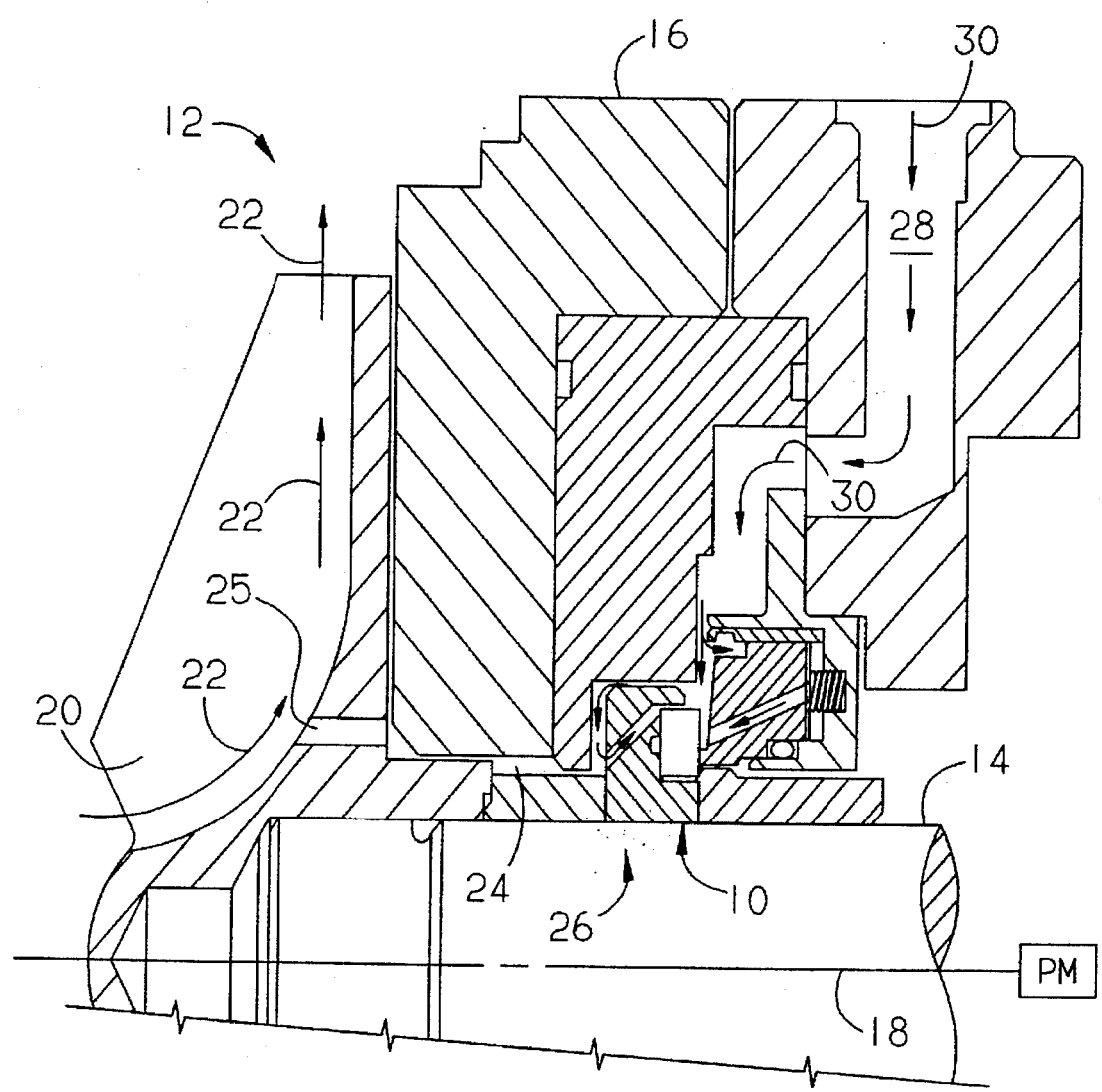
FIG. 1 is a cross sectional view of a mechanical face seal according to our invention in an impeller pump.

FIG. 1 depicts an exemplary embodiment of a mechanical face seal 10 according to our invention in a fluid device in the form of a centrifugal pump 12. The centrifugal pump 12 includes a first member, in the form of a shaft 14, extending through a second member, in the form of a pump housing 16. Shaft 14 is rotatable about axis 18 and transmits torque from a prime mover, PM, such as an electric motor, to the pump impeller 20 which displaces the liquid being pumped, as indicated by arrows 22. As the prime mover PM rotates the shaft 14, the impeller 20 induces a flow of fluid from a radially inner inlet of the impeller to a radially outer outlet of the impeller as indicated by the arrows 22. The impeller 20 and a shroud portion (not shown) of the housing 16 surrounding the impeller are shaped such that as the fluid 22 is pumped from the inner to the outer extent of the impeller 20 the pressure of the fluid is increased due to the centrifugal action of the impeller 20.

Figure 2:
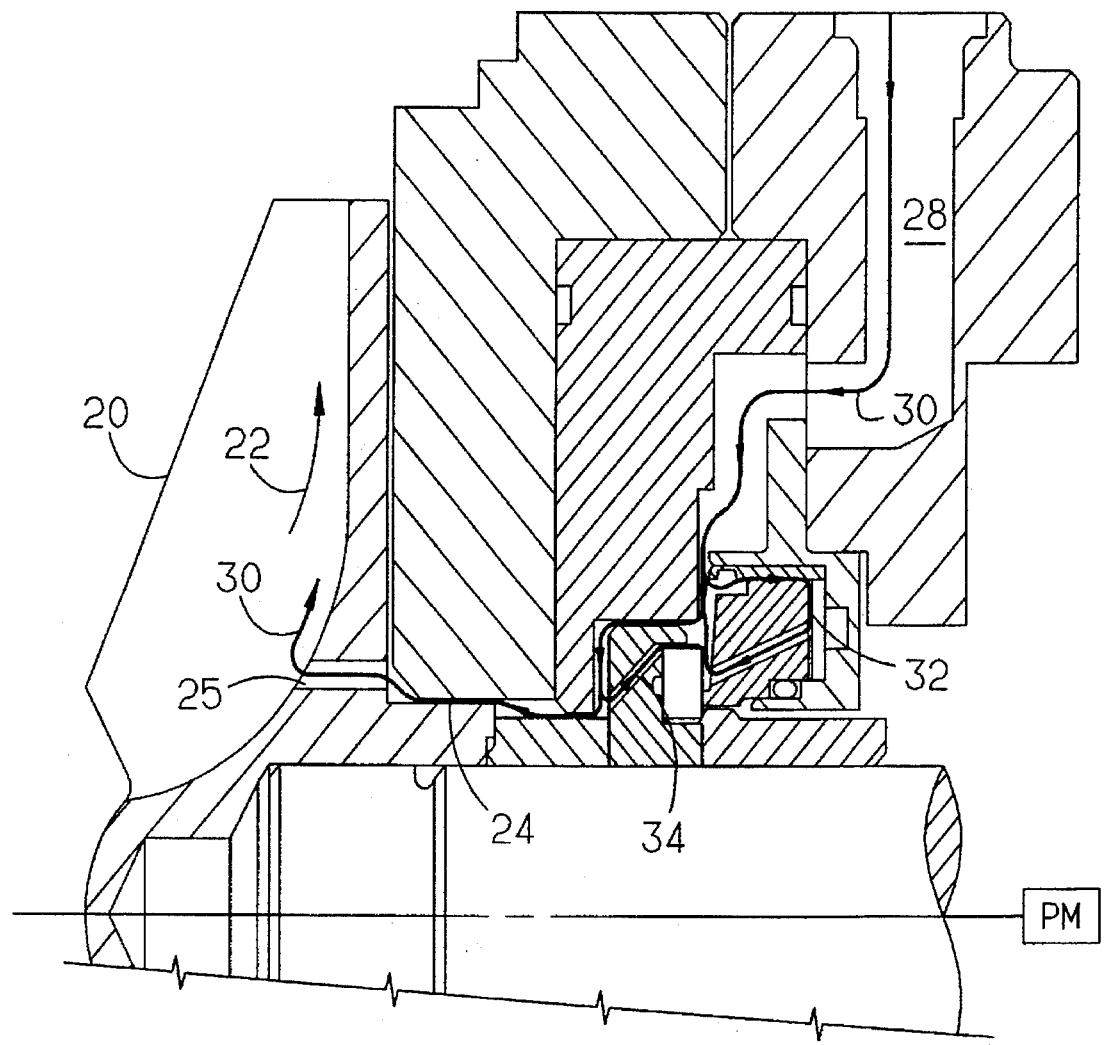
FIG. 2 is a diagram of the coolant flow path through a mechanical face seal according to our invention in an impeller pump.

In order to allow the shaft 14 and impeller 20 to rotate freely with respect to the housing 16, an annular gap 24 must be provided and maintained between the shaft and impeller 14, 20 and the housing 16. The face seal 10 is disposed within the annular gap 24 at a juncture 26 of the shaft 14 and the housing 16 in order to prevent the liquid being pumped 22 from flowing through the annular gap 24 and past the juncture 26 into a cavity (not shown) of the housing 16 in which the prime mover PM is mounted. A wash plenum 28 disposed adjacent the face seal 10 provides means for supplying a flow of fluid 30 to the juncture 26 of the shaft 14 and housing 16 for lubricating and cooling the face seal 10. The flow of fluid 30 from the wash plenum 28 flows generally through the portion of the annular gap 24 to the left of the face seal 10, as depicted in FIGS. 1 and 2, and exits the annular gap 24 through balance holes 25 passing through the impeller 20 to rejoin the flow of fluid, as indicated by arrows 22, 30 being pumped by the impeller 20.

Figure 3:
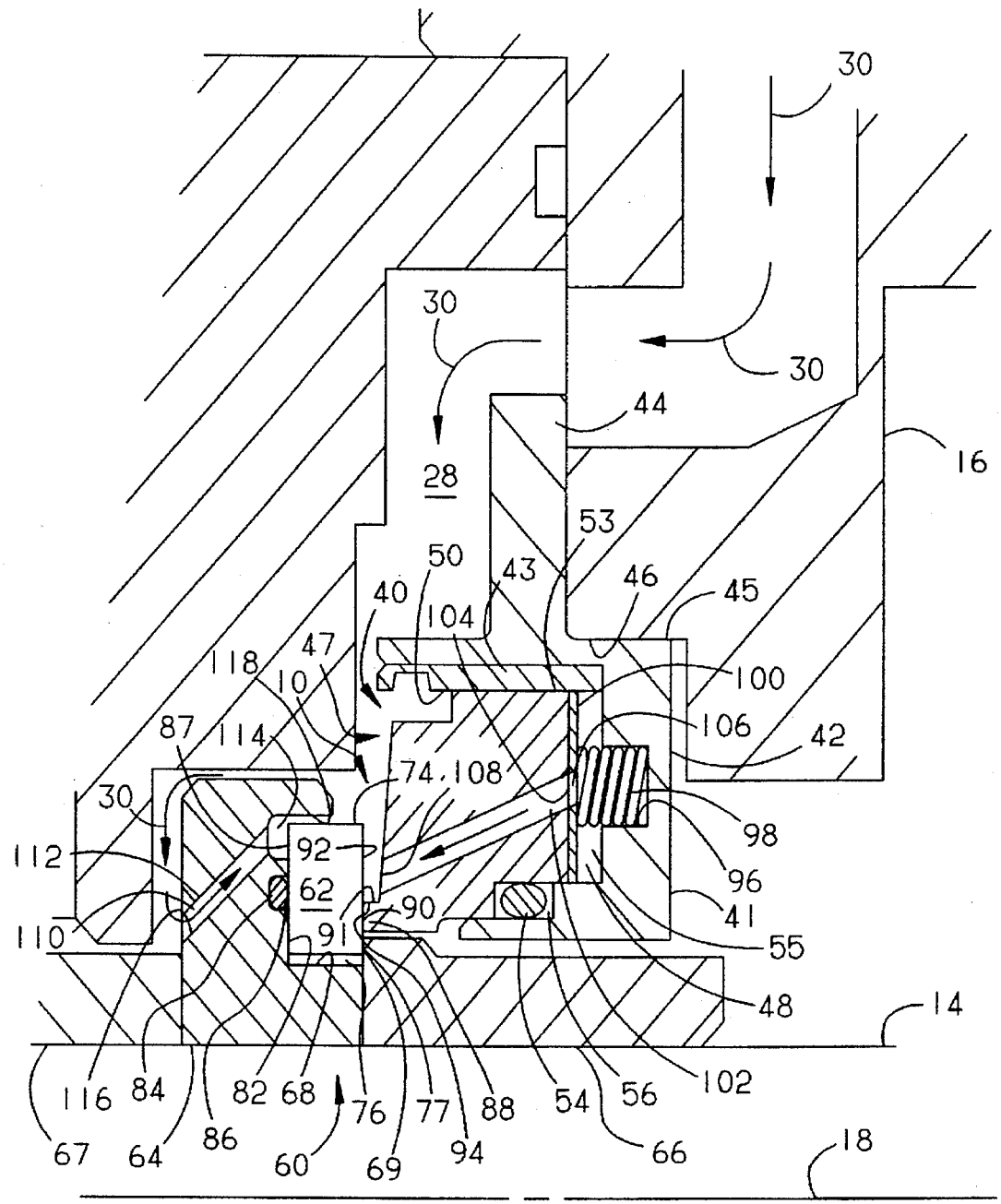
FIGS. 3 and 3a are enlarged cross sectional views depicting the seal elements of two embodiments of a mechanical face seal according to our invention in an impeller pump.

As shown in FIG. 3, the face seal 10 includes a first, non-rotating element 40 and a second rotating element 60. The first element 40 is fixedly attached to the housing 16 in a manner precluding rotation of the first element 40 of the seal 10 with respect to the housing 16. Specifically, the first element 40 is attached to the housing 16 via a retainer assembly 41. The first element 40 is formed of a material having good wear properties, such as carbon-graphite, and the retainer assembly elements are fabricated from a material such as stainless steel. The retainer assembly 41 includes an outer ring 42 which defines a flange 44 and a boss 45 which respectively serve to position the retainer axially and radially within a bore 46 of the housing 16. The outer ring is fixedly attached to the housing 16 by means of a press fit between the boss 45 and the bore 46 and/or mechanical retaining means (not shown) extending through the flange 44 in such a manner that the outer ring 42 does not rotate with respect to the housing 16. The retainer assembly 41 further includes an inner ring 43 which is integrally attached to the outer ring 42 by means of a press fit to define an annular shaped cavity 47 for receipt of the first element 40 of the face seal 10. As best seen in FIGS. 3 and 9, the inner ring 43 of the retainer 41 includes a series of lugs 50 configured to engage a series of matching notches 52 in a radially outer surface of the first element 40. In general, the outer periphery of the seal element 40 and the inner ring 43 are configured to provide a loose fit of about 0.020–0.030 inches clearance for instance, such that the first element 40 may move with relative freedom axially within the annular cavity 47, but be restrained against rotation about the axis 18 by the mating action of the notches 52 with the lugs 50. An O-ring packing 54 is disposed within an inner annular clearance 56 between the first seal element 40 and the retainer 41 to allow the first element 40 to move axially with respect to the retainer 41, but to block leakage of fluid through the inner annular clearance 56.

In a preferred embodiment of the face seal 10, as depicted and described herein, the second element 60 of the face seal 10 includes a mating ring insert 62 which is fixedly attached to the shaft 14 for rotation therewith by a mating ring carrier 64 fabricated from a material such as stainless steel. Specifically, the mating ring carrier 64 is clamped by means (not shown) for applying axial pressure between two collars 66, 67 in such a manner that the mating ring carrier 64 is integrally clamped to and rotates with the shaft 14. As best seen by simultaneously comparing FIGS. 3–5, the mating ring carrier 64 defines an annular recess 68 therein for receipt of the mating ring insert 62. As shown in FIGS. 5 and 7, a series of circumferentially spaced flats 70 are provided in an outer wall of the annular recess 68 to engage with a matching series of flats 72 on the outer periphery of the mating ring 62, in order to prevent rotation of the mating ring insert 62 with respect to the mating ring carrier 64. The mating ring insert 62 and the carrier 64 are further configured in a complementary manner to provide a radially outer and inner clearance 74, 76 respectively of about 0.005 inches between the mating ring insert 62 and the carrier 64. The collar 66 includes a shoulder 69 that serves to axially retain the mating ring 62 within the annular recess 68. The collar 66, mating ring 62 and mating ring carrier 64 are configured to provide an axial clearance 77 of about 0.002 inches between the shoulder 69 and the mating ring 62. By virtue of the clearances 74, 76, 77 and the driving action of the engaged flats 70, 72, the mating ring insert 62 is not clamped by the carrier 64, thus leaving the mating ring 62 free to move axially and radially, while constraining the insert 62 to rotate with the shaft 14. The seal 10 of our invention thus meets the requirements of API Standard 682 requiring that the faces 87, 90 of the silicon carbide portion of the seal not be clamped.

As shown in FIGS. 6 and 7, in a preferred embodiment of our invention, the mating ring insert 62 includes an inner element 78 of a hard material such as silicon carbide upon which is shrink fitted an outer anti-rotation ring 80 of a material such as invar. The use of such an anti-rotation ring 80 provides additional insurance against fracture of the silicon carbide element 78 due to high localized stresses which may occur at the interface between the flats 72 in the anti-rotation ring and the flats 70 in the mating ring carrier 64. Such a two piece construction for the mating ring insert 62 meets the requirements of API Standard 682, that the insert be loose-fitting within the carrier 64, and that the faces 87, 90 not be clamped, to preclude fracture of the relatively brittle silicon carbide element 78, and to facilitate repair and maintenance.

The configuration of the seal 10 of our invention provides several additional benefits. The axial position of the shaft 14 and impeller 20 are not dependent upon the condition, or even upon the presence, of the mating ring 62 or the stationary element 40 of the seal 10. Thus, even if the mating ring 62 or the stationary element 40 were to fracture, the impeller 20 could not move into contact with the housing 16. Furthermore, experience has shown that the anti-rotation ring 80, and the annular recess 68 in the mating ring carrier 64 tend to retain the mating ring 62 intact and in place even if the silicon carbide element 78 should somehow become cracked.

The annular recess 68 in the mating ring carrier 64 further includes an axial face 82 thereof against which the rear face 87 of the insert 62 may bear. A trepan groove 84 is provided in the axial face 82 for receipt of an O-ring packing 86 to prevent leakage of fluid from the wash plenum 28 between the mating ring carrier 64 and the insert 62.

The first element 40 defines a radially extending planar first faying surface 88 of the face seal 10. The mating ring insert 62 of the second element 60 of the seal defines a second faying surface 90 of the seal 10. The second faying surface 90 of the mating ring 62 includes a first portion 91 thereof which is configured to bear against a mating portion of the first faying surface 88 of the first element 40, and a second portion 92 thereof which extends radially outward beyond the first faying surface 88 of the first element 40. The first portion 91 of the second faying surface 90 in conjunction with the mating portion of the first faying surface 88 therefore define a contact area 94 of the seal 10.

Means for urging the first portion 91 of the second faying surface 90 and the first faying surface 88 to bear against one another in the contact area 94 are provided by a series of circumferentially spaced springs 98. The springs 98 are helical compression springs disposed within pockets 96 in the retainer 41 in such a manner to urge the first element 40 of the seal 10 to move toward the left as depicted in FIGS. 1–3. A load bearing washer 100 is disposed between the coil springs 98 and the first element 40 to prevent the springs 98 from eating into or otherwise damaging the material of the first element of the seal 40. The combined force of the coil springs 98 is therefore reacted sequentially through the bearing washer 100, the mating ring 62 and into the mating ring carrier 64. The springs 98 not only provide an axially directed force for maintaining virtually intimate contact between the first and second elements 40, 60 of the seal in the contact area 94, but also serve to load the mating ring insert 62 axially to thereby help to retain it within the annular recess 68 of the mating ring carrier 64.

As shown in FIGS. 3, 8 and 9, the first element 40 defines a series of 12 passages 102 therein for directing a flow of fluid against the second portion 92 of the second faying surface 90 of the second element 60 of the seal 10 for lubricating and cooling the seal 10. Specifically, each of the 12 passages include an inlet 104 which is aligned with a hole 106 through the bearing washer 100 to provide fluid communication between the inlet and the wash plenum 28 via an annular axial clearance 55 and an outer annular radial clearance 53 between the first element 40 of the seal 10 and the retainer 41, whereby the passages 102 receive a first flow 32, as best seen in FIG. 2 of fluid therefrom. The passages 102 further include an outlet 108 configured for directing the first flow 32 of fluid against the second portion 92 of the second faying surface 90 of the mating ring insert 62 of the second element 60 of the seal 10. The interior of the non-rotating first element 40 of the seal 10 is thus cooled directly by the first flow 32 of fluid through the passages 102. The second element 60, and specifically the insert 62 is also directly cooled by the first flow 32 of fluid impinging against the second portion 92 of the second faying surface 90.

Those having skill in the art will readily appreciate that by virtue of extending the second faying surface 90 radially outward beyond the contact area 94 and providing the impinging first flow of fluid 32, a higher first flow of fluid 32 can be provided than in prior face seals, thus providing superior cooling of the second element of the seal. Furthermore, because the first flow of fluid is directed by the outlet 108 to impinge directly on the second portion 92 of the mating ring insert 62, cooling of the insert 62 is particularly effective. This is so because as the fluid in the first flow 32 impinges against the surface 92, the impinging action breaks through any boundary layer of fluid which might otherwise be attached to the surface 92 and theoretically brings each molecule of the fluid in the first flow 32 into intimate contact with the second portion 92 of the mating ring insert 62.

In a preferred embodiment of a seal 10 according to our invention, the second element 60 also defines at least one passage therein which includes a radially inner inlet and a radially outer outlet for centrifugally urging a second flow of fluid from the radially inner inlet to the radially outer outlet when the second member of the pump is rotated about the axis of rotation 18. In the specific embodiment depicted herein, as best seen in FIGS. 3 and 4, the passage 110 in the second element 60 is defined in combination by angularly oriented passages 112, a fluid groove 114 extending circumferentially around a radially outer corner of the annular recess 68 in the mating ring carrier, and the radially outer clearance 74 between the outer periphery of the insert 62 and the mating ring carrier 64. The passage 110 includes a radially inner inlet 116 disposed in fluid communication with the wash plenum 28 via the annular gap 24, and a radially outer outlet 118 providing a means for discharging fluid at a point radially outward of the contact area 94 of the seal 10.

As the second element 60 of the seal rotates in unison with the shaft 14, the passage 110 in the second element 60 functions as a centrifugal pump by centrifugally urging a second flow 34 of fluid to flow from the inlet 116 to the outlet 118 of the passage 110 in the second element 60. The relationship of the first and second flows 32, 34 of fluid to and from the wash plenum 28 are best illustrated in FIG. 2.

Those skilled in the art will recognize that by virtue of designing the mating ring insert 62 and carrier 64 in a complementary manner to utilize the fluid groove 114 and the radially outer clearance 74 to define a portion of the passage 110 in the second element 60, a portion of the second flow of fluid 34 is constrained to flow along a surface of the mating ring insert 62 for cooling the insert 62. It will be further appreciated that the configuration of the passage 110 in the second element as described above also constrains a portion of the second flow of fluid 34 to impinge upon a surface of the mating ring insert 62 for cooling the insert 62 as the second flow of fluid is pumped from the inlet 116 to the outlet 118 of the passage 110 in the second element 60 of the seal 10. It will be yet further appreciated that by virtue of orienting the O-ring packing 86 and its trepan groove 84 radially inward of the passage 110 within the second element 60, the second flow 34 of fluid is prevented from flowing between the insert 62 and the carrier 64.

Figure 3A:
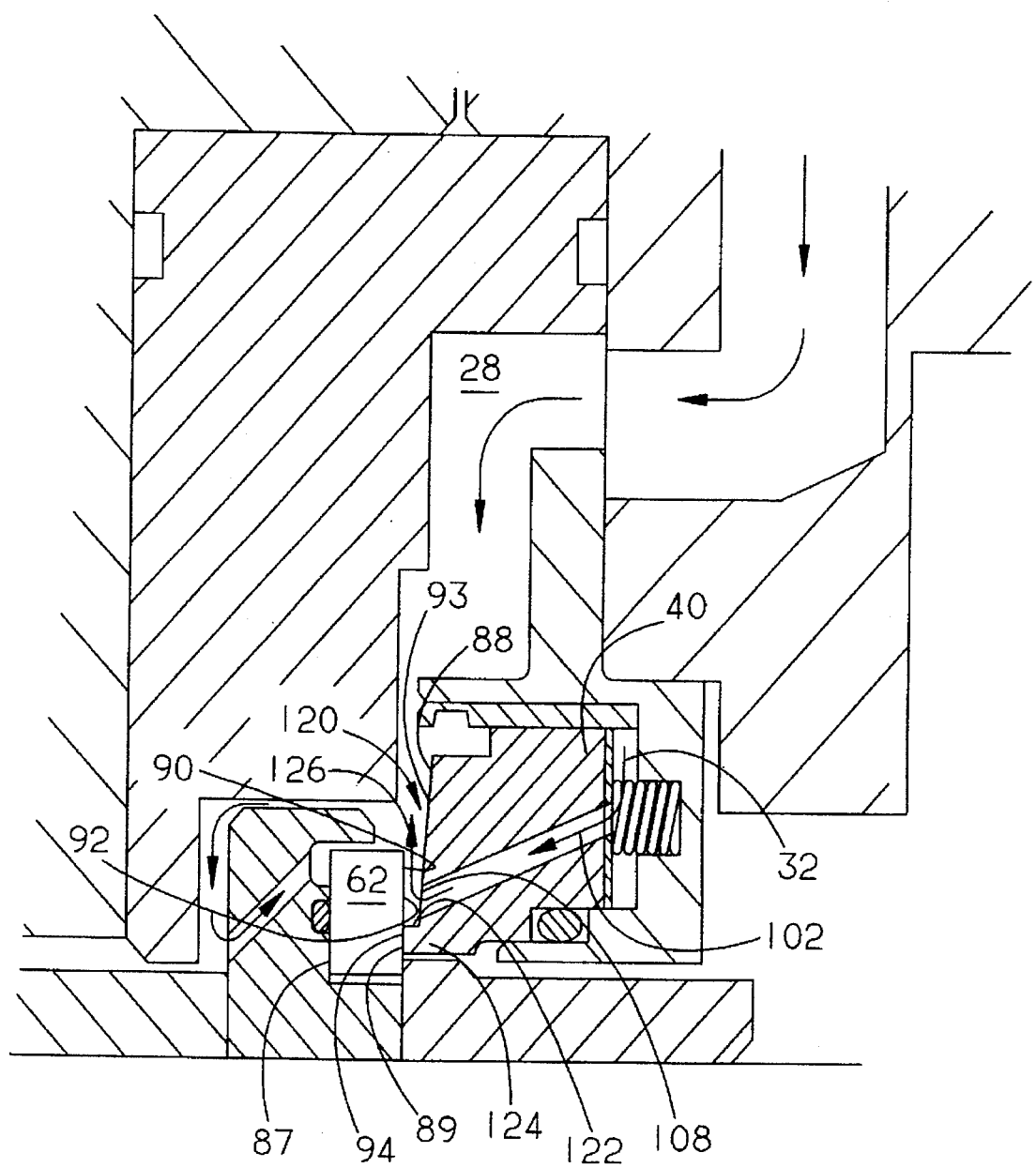

FIG. 3a illustrates a highly preferred embodiment of our invention that is especially pertinent to seals 10 which operate at high rotational speeds, of up to about 35,000 rpm for example. As shown in FIG. 3a, the first faying surface 88 is configured to have a first portion 89 defining the contact area 94 of the first element 40, and a second portion 93 of the first faying surface 88 spaced axially away from the second portion 92 of the second faying surface 90 in a complementary manner, to thereby form an annular gap 120 which opens radially outwardly into the wash plenum 28. Specifically, the first faying surface 88 includes a step 122 located at the radially outer edge of the contact area 94 between the first and second portions 89, 93 respectively of the first faying surface 88. As a result of the step 122, a nose 124 is formed in the non-rotating element 40 adjacent the contact area 94.

The fluid passages 102 are configured to have their outlets 108 discharge into the annular gap 120 at a radially inner portion thereof, immediately adjacent to the step 122 and the nose 124. The outlet 108 of the passage 102 is positioned to preferably discharge fluid in a manner, as illustrated by arrow 126, such that the fluid impinges on the step 122, thereby providing enhanced cooling of the nose 124, and also impinges upon the second portion 92 of the second faying surface 90 at a point just radially outward from the contact area 94, thereby providing enhanced cooling of the mating ring insert 62.

As the shaft 14 rotates and drives the mating ring 62, the second portion 92 of the second faying surface 90 acts as a centrifugal pump urging the fluid within the annular gap 120 to be pumped in a generally radially outward direction into the wash plenum 28. As the fluid is pumped radially outward, it flows along the second portions 93, 92 of the first and second faying surfaces 88, 90 respectively, thereby providing enhanced cooling of both the mating ring 62 and the non-rotating element 40 of the seal 10. The fluid being pumped out of the annular gap 120 is replaced by fluid flowing into the gap 120 from the fluid passage 102 in the non-rotating element 40.

Those having skill in the art will recognize that the embodiment of our invention depicted in FIG. 3a provides a superior means of removing heat generated in the command area 94. This is so for several reasons.

First by configuring the seal elements 40, 62 to form the annular gap 120, and by locating the outlet 108 immediately adjacent the contact area 94, a pumped cooling loop is established which continuously feeds a fresh supply of relatively cool fluid from the wash plenum 28 directly to the immediate vicinity of the contact area 94.

Second, by making the nose 124 extend only across the contact area 94, the overall size of the nose 124 is kept small. By orienting the outlet 108 to cause the relatively cool fluid being discharged from the outlet 108 to directly impinge on the step 122, cooling of the nose 124 is highly effective.

This combination of a small nose 124 size and direct impingement cooling of the nose 124 are particularly advantageous where materials having relatively low thermal conductivity, such as carbon graphite, are utilized for the seal element 40 defining the nose 124. Because the nose 124 is small and the cooling so effective, the nose 124 will be maintained at a uniform temperature, and at a temperature lower than otherwise achievable if it were necessary to rely on conductive heat transfer from the nose 124 through the remainder of the first seal element 40.

By supplying a flow of cooling fluid into the annular gap 120 at a point just radially outward from the contact area, our invention provides solutions to lubrication and cooling problems encountered in prior high speed seals. For prior seals rotating at high speed, and not having means such as the passage 102 of our seal for providing a flow of fresh fluid into the area adjacent the contact area, the pumping action of the rotating member of the seal prevents fluid from the wash plenum from effectively reaching the contact area. The pumping action also creates a localized area of low fluid pressure adjacent the contact area. The localized area of low pressure, in combination with higher temperatures in the contact area resulting from poorer cooling, can cause the fluid adjacent the contact area to flash to a vapor state. This is particularly problematic where the fluid for high vapor pressure liquids such as petroleum products, propane, liquid natural gas, etc. This flashing drastically reduces heat transfer from the contact area. The flashing also prevents liquid fluid from being drawn into the contact area for seal lubrication, thereby resulting in increased friction and heat generation which can lead to premature seal failure.

Positioning the outlet 108 of the passage 102 in our seal to discharge directly into the annular gap 120 also provides superior performance to that which could be achieved by positioning the outlet 108 to discharge directly into the contact area, as is done in some prior seals. This is so because, as previously discussed, the flow rate of coolant through the passage 102 in our invention can be much higher than it could be if the fluid were discharged directly into the contact area.

We also specifically wish to point out that in practicing the embodiment of our invention depicted in FIG. 3a, the fluid for cooling could also be fed into the annular gap 120 from a passage (not shown) passing through the second element 60 of the seal 10.

From the foregoing description, those skilled in the art will readily recognize that by configuring the seal elements as described herein and incorporating fluid passages through either or both of the first and second elements of the face seal 10 for directing a flow of cooling fluid into the annular gap 120, and/or directly at the various elements of the seal, our invention overcomes problems encountered in prior attempts to provide cooling for a high speed mechanical face seal, including those seals having a loose fitting mating ring 62 in accordance with API standards. Our invention thus improves seal life and performance by increasing cooling fluid flow rates and dissipating a greater amount of heat than prior seals.

Those skilled in the art will further recognize that, although we have described our invention herein with respect to specific embodiments and applications thereof, many other embodiments and applications of our invention are possible within the scope of our invention as described in the appended claims. For example, both the housing 16 and the shaft 14 could rotate about the axis 18 in other embodiments, so long as there is relative rotation between the housing and shaft 16, 14. Means other than the flats 70, 72 in the mating ring carrier 64 and mating ring 62, respectively, such as a wavy spring disposed in a radial clearance 76, as shown in FIG. 3, between the inner diameter of the mating ring 62 and the carrier 64, could be utilized to ensure that the insert 62 will not rotate with respect to the carrier 64. In some embodiments of our invention, it may be desirable to utilize only the passages 102 through the stationary portion 40 of the seal 10. In other embodiments it may be desirable to utilize only the passage 110 through the second element 60 of the seal 10. Many other material combinations for the first and second elements of the seal may also be utilized within the scope of our invention. Likewise, there are almost an infinite range of means available for urging the two seal elements into contact with one another, and for fixedly attaching the first and second elements respectively to the first and second members of the device within which the seal 10 is installed. It may also be desirable in some installations to have the fluid for lubricating and cooling the seal be provided from a source other than the flow of liquid 22 being pumped by the impeller 20. For instance, where the fluid being pumped is extremely caustic, it may be desirable to provide a second seal means 10 for blocking leakage of the fluid utilized for lubrication and cooling into the impeller area, and providing a separate flow of a lubricant such as oil to the area between the two seals.

We wish to particularly emphasize that our invention is applicable in embodiments not subject to API Standard 682, wherein it is permissible to clamp across the faces of a silicon carbide mating ring.

It is understood, therefore, that the spirit and scope of the appended claims should not be limited to the specific embodiments described and depicted herein.

We claim:

1. In a fluid device having a first and a second member wherein said second member extends through said first member and is mounted for rotation relative thereto about an axis of rotation extending through said first and second members, and further having means for providing a flow of fluid to a juncture of said first and second members, face seal means for preventing said fluid from leaking past said juncture, said face seal means comprising:

a first element attached fixedly to the first member in a manner precluding rotation with respect thereto and defining a first faying surface of said seal;

a second element attached fixedly to the second member for rotation therewith and defining a second faying surface of the seal;

said second faying surface including a first portion thereof configured to bear against a mating portion of said first faying surface of said first element, and a second portion thereof extending radially outward beyond said first faying surface;

said first portion of said second faying surface in conjunction with said mating portion of said first faying surface defining a contact area of said seal; and means for urging said first portion of said second faying surface and said first faying surface to bear against one another in said contact area;

said first element defining at least one passage therein having an inlet in fluid communication with said means for providing a flow of fluid whereby said passage receives a first flow of said fluid therefrom, and an outlet configured for directing said first flow of fluid against said second portion of said second faying surface of said second element of said seal for lubricating and cooling said seal;

said second element defining at least one passage therein having a radially inner inlet and a radially outer outlet for centrifugally urging a second flow of fluid from said radially inner inlet to said radially outer outlet when said second member of said fluid device is rotated about said axis of rotation;

said radially inner inlet being disposed in fluid communication with said means for providing said flow of fluid, and said radially outer outlet being disposed radially outward of said contact area of said seal.

2. The fluid device of claim 1 wherein said second element of said seal further includes:

a) a mating ring insert defining said second faying surface;

b) a mating ring carrier for connecting said mating ring insert to said shaft;

c) means for preventing rotation of said mating ring insert with respect to said mating ring carrier; and d) a packing disposed between said mating ring insert and carrier for blocking a flow of fluid between said insert and carrier;

said passage in said second element being disposed within said mating ring carrier and having said outlet disposed to discharge said second flow of fluid at a point radially outward of said packing.

3. The fluid device of claim 2 wherein said mating ring insert and carrier are configured in a complementary manner to provide radial clearance between said insert and carrier such that said insert is not radially clamped by said carrier.

4. The fluid device of claim 3 wherein said passage in said second element of said seal includes a portion of said radial clearance disposed radially outward of said packing.

5. The fluid device of claim 3 wherein said mating ring carrier defines a recess for receipt therein of said mating ring insert, and said mating ring insert is disposed within said recess.

6. The fluid device of claim 3 wherein said mating ring insert and carrier are configured to define a portion of said passage in said second element of the seal whereby, in flowing from said inlet to said outlet of said passage, a portion of said second flow of fluid is constrained to flow along a surface of said mating ring insert for cooling said insert.

7. The fluid device of claim 3 wherein said mating ring insert and carrier are configured to define a portion of said passage in said second element of the seal whereby, in flowing from said inlet to said outlet of said passage, a portion of said second flow of fluid is constrained to impinge upon a surface of said mating ring insert for cooling said insert.

8. In a fluid device having a first and a second member wherein said second member extends through said first member and is mounted for rotation relative thereto about an axis of rotation extending through said first and second members, and further having means for providing a flow of fluid to a juncture of said first and second members, face seal means for preventing said fluid from leaking past said juncture, said face seal means comprising:

a first element attached fixedly to the first member in a manner preventing rotation relative thereto and defining a first faying surface of said seal;

a second element attached fixedly to the second member for rotation therewith and defining a second faying surface of the seal;

said second faying surface including a first portion thereof configured to bear against a mating portion of said first faying surface of said first element, and a second portion thereof extending radially outward beyond said first faying surface;

said first portion of said second faying surface in conjunction with said mating portion of said first faying surface defining a contact area of said seal; and means for urging said first portion of said second faying surface and said first faying surface to bear against one another in said contact area;

said first element defining at least one passage therein having an inlet in fluid communication with said means for providing a flow of fluid whereby said passage receives a first flow of said fluid therefrom, and an outlet configured for directing said first flow of fluid against said second portion of said second faying surface of said second element of said seal for lubricating and cooling said seal.

9. In a fluid device having a first and a second member wherein said second member extends through said first member and is mounted for rotation relative thereto about an axis of rotation extending through said first and second members, and further having means for providing a flow of fluid to a juncture of said first and second members, face seal means for preventing said fluid from leaking past said juncture, said face seal means comprising:

a first element attached fixedly to the first member in a manner preventing rotation relative thereto and defining a first faying surface of said seal;

a second element attached fixedly to the second member for rotation therewith and defining a second faying surface of the seal;

said second faying surface including a first portion thereof configured to bear against a mating portion of said first faying surface of said first element, and a second portion thereof extending radially outward beyond said first faying surface;

said first portion of said second faying surface in conjunction with said mating portion of said first faying surface defining a contact area of said seal; and means for urging said first portion of said second faying surface and said first faying surface to bear against one another in said contact area;

said second element defining at least one passage therein having a radially inner inlet and a radially outer outlet for centrifugally urging a second flow of fluid from said radially inner inlet to said radially outer outlet when said second member of said fluid device is rotated about said axis of rotation;

said radially inner inlet being disposed in fluid communication with said means for providing said second flow of fluid, and said radially outer outlet being disposed radially outward of said contact area of said seal.

10. In a fluid device having a first and a second member wherein said second member extends through said first member and is mounted for rotation relative thereto about an axis of rotation extending through said first and second members, and further having means for providing a flow of fluid to a juncture of said first and second members, face seal means for preventing said fluid from leaking past said juncture, said face seal means comprising:

a first element attached fixedly to the first member in a manner precluding rotation with respect thereto and defining a first faying surface of said seal;

a second element attached fixedly to the second member for rotation therewith and defining a second faying surface of the seal;

each of said first and said second faying surfaces including a first portion thereof configured and juxtaposed to bear against the first portion of the other to define a contact area of said seal;

each of said first and said second faying surfaces further including a second portion thereof extending radially outward beyond said contact area, said second portions being configured to define a radially outwardly opening annular gap between said second portions of said first and said second faying surfaces;

means for urging said first portions of said first and said second faying surfaces to bear against one another in said contact area; and means for directing a first flow of fluid from said means for providing a flow of fluid into said annular gap at a radially inner portion thereof for lubricating and cooling said seal;

whereby rotation of said second portion of second element centrifugally urges said first flow of fluid to enter said annular gap at said radially inner portion thereof and to exit said annular gap through the radially outwardly facing opening thereof.

11. The fluid device of claim 10 wherein said means for directing said first flow of fluid is provided by configuring said first element to define at least one passage therein having an inlet in fluid communication with said means for providing a flow of fluid whereby said passage receives said first flow of said fluid therefrom, and an outlet configured for directing said first flow of fluid into said annular gap at a radially inner portion thereof for lubricating and cooling said seal.

12. The fluid device of claim 10 wherein said means for directing said first flow of fluid is provided by configuring said second element to define at least one passage therein having an inlet in fluid communication with said means for providing a flow of fluid whereby said passage receives said first flow of said fluid therefrom, and an outlet configured for directing said first flow of fluid into said annular gap at a radially inner portion thereof for lubricating and cooling said seal.

13. The fluid device of claim 10 wherein said second element further defines:

at least one passage therein having a radially inner inlet and a radially outer outlet for centrifugally urging a second flow of fluid from said radially inner inlet to said radially outer outlet when said second member of said fluid device is rotated about said axis of rotation;

said radially inner inlet being disposed in fluid communication with said means for providing said flow of fluid, and said radially outer outlet being disposed to discharge into said annular gap at a point of discharge located radially outward of said contact area of said seal.

* * * * *